United States Patent
Pomerance

(10) Patent No.: US 10,732,971 B1
(45) Date of Patent: Aug. 4, 2020

(54) METHOD OF CONSTRUCTING DYNAMICAL SYSTEMS FOR SOLVING BOOLEAN SATISFIABILITY

(71) Applicant: Andrew Pomerance, Alexandria, VA (US)

(72) Inventor: Andrew Pomerance, Alexandria, VA (US)

(*) Notice: Subject to any disclaimer, the term of this patent is extended or adjusted under 35 U.S.C. 154(b) by 0 days.

(21) Appl. No.: 15/890,197

(22) Filed: Feb. 6, 2018

Related U.S. Application Data

(60) Provisional application No. 62/454,944, filed on Feb. 6, 2017.

(51) Int. Cl.
*G06F 30/00* (2020.01)
*G06F 9/30* (2018.01)
*G06F 17/11* (2006.01)
*G06F 16/33* (2019.01)

(52) U.S. Cl.
CPC ........ *G06F 9/30029* (2013.01); *G06F 16/334* (2019.01); *G06F 17/11* (2013.01)

(58) Field of Classification Search
CPC .............................. G06F 17/11; G06F 9/30029
USPC ........................................................ 716/106
See application file for complete search history.

(56) References Cited

U.S. PATENT DOCUMENTS

| | | | |
|---|---|---|---|
| 6,247,164 B1* | 6/2001 | Ashar | G06F 30/3323 716/104 |
| 2016/0321039 A1* | 11/2016 | Chaudhuri | G06F 8/51 |
| 2017/0031806 A1* | 2/2017 | Purandare | G06F 17/50 |

* cited by examiner

*Primary Examiner* — Suchin Parihar
(74) *Attorney, Agent, or Firm* — Krishna Kalidindi

(57) ABSTRACT

A method for generating dynamical systems that can be instantiated on reconfigurable computing platforms for solving instances of the Boolean satisfiability problem (SAT) is disclosed. When the SAT instance can be satisfied by an appropriate assignment of the variables, the dynamical system has a fixed point attractor that corresponds to a satisfying assignment of variables. When the SAT instance cannot be satisfied by any assignment of variables, there is no such fixed point attractor. Exemplary embodiments represent a physically-realizable computing device that solves SAT problems outside the Turing machine paradigm. Exemplary embodiments detect when the system reaches a fixed point attractor.

16 Claims, 4 Drawing Sheets

$\varphi = (x_1 \vee x_2 \vee x_3) \wedge (x_1 \vee x_5 \vee x_7) \wedge (\neg x_1 \vee x_4 \vee x_9) \wedge (\neg x_{10} \vee \neg x_1 \vee x_8)$ $F_1 = (x_2 \vee x_3) \wedge (x_5 \vee x_7) \qquad G_1 = (x_4 \vee x_9) \wedge (\neg x_{10} \vee x_8)$

200

METHOD OF CONSTRUCTING DYNAMICAL SYSTEMS FOR SOLVING BOOLEAN SATISFIABILITY

BACKGROUND

The present disclosure is directed to Boolean Satisfiability (SAT) instances and more particularly to using reconfigurable computing devices to solve SAT instances.

Boolean Satisfiability (SAT) is the problem of finding values for a set of Boolean variables that makes a given Boolean formula (evaluate to) TRUE. SAT is an NP-complete problem. If no assignment of the Boolean variables makes the Boolean formula TRUE, then the formula is called unsatisfiable. The formula is typically presented in a conjunctive normal form (CNF). That is, the formula is presented as the conjunction (logical AND operation) of a set of disjunctions (logical OR operations) of one or more Boolean literals. The literals consist of variables or their logical negation. This is a general form since arbitrary Boolean functions can be reduced to a CNF.

Typically, in solving SAT, software running on general-purpose computers is utilized, which is necessarily based on the Turing machine paradigm of computation. SAT solvers come in two varieties depending on their behavior when the given Boolean formula is unsatisfiable. Complete methods are guaranteed to terminate in all cases and provide a proof that the given formula is unsatisfiable. Incomplete methods only terminate when a satisfying assignment of the variables is found; if the algorithm proceeds beyond a user-definable threshold number of steps, it is assumed that the formula is unsatisfiable, but there is no proof that it truly is unsatisfiable.

Reconfigurable computing devices such as field-programmable gate arrays (FPGAs) can also be used to accelerate solving SAT instances. These approaches, however, are hardware implementations of classical algorithms and thus reducible to the Turing paradigm.

SUMMARY

According to an exemplary embodiment, a method for generating dynamical systems that solve SAT instances and can be instantiated on reconfigurable computing platforms such as FPGAs. When the SAT instance can be satisfied by an appropriate assignment of the variables, the dynamical system has a fixed point attractor that corresponds to a satisfying assignment of variables. When the SAT instance cannot be satisfied by any assignment of variables, there is no such fixed point attractor. Exemplary embodiments represent a physically-realizable computing device that solves SAT problems outside the Turing machine paradigm. Exemplary embodiments detect when the system reaches a fixed point attractor.

According to another exemplary embodiment, a method for determining Boolean satisfiability (SAT) is disclosed. The method comprises: processing an input conjunctive normal form (CNF) Boolean formula; converting the processed input CNF Boolean formula to a physical system; and monitoring an output of the physical system to determine if a steady state has been reached.

According to a further exemplary embodiment, a system for determining Boolean satisfiability (SAT) is disclosed. The system comprises: a first module processing an input conjunctive normal form (CNF) Boolean formula and outputting a hardware description file (HDF); and a second module receiving the HDF from the first module, performing circuit synthesis on the received HDF and programming a reconfigurable computing device, wherein the reconfigurable computing device comprises: a dynamical system circuit including a collection of circuit elements, the dynamical system circuit being derived from the CNF formula processed in the first module; and a SAT detector circuit receiving output of each of the elements of the dynamical system circuit and outputting a decision on whether logical values associated with the received output of the elements satisfies a Boolean satisfiability of a given SAT instance.

BRIEF DESCRIPTION OF THE DRAWINGS

The several features, objects, and advantages of exemplary embodiments will be understood by reading this description in conjunction with the drawings. The same reference numbers in different drawings identify the same or similar elements. In the drawings.

DETAILED DESCRIPTION

In the following description, numerous specific details are given to provide a thorough understanding of exemplary embodiments. The embodiments can be practiced without one or more of the specific details, or with other methods, components, etc. In other instances, well-known structures, or operations are not shown or described in detail to avoid obscuring aspects of the exemplary embodiments.

Reference throughout this specification to an "exemplary embodiment" or "exemplary embodiments" means that a particular feature, structure, or characteristic as described is included in at least one embodiment. Thus, the appearances of these terms and similar phrases in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments.

A method for generating dynamical systems that solve SAT instances and can be instantiated on reconfigurable computing platforms such as FPGAs is described in exemplary embodiments. When the SAT instance can be satisfied by an appropriate assignment of the variables, the dynamical system has a fixed point attractor that corresponds to a satisfying assignment of variables. When the SAT instance cannot be satisfied by any assignment of variables, there is no such fixed point attractor. Exemplary embodiments represent a physically-realizable computing device that solves SAT problems outside the Turing machine paradigm. Exemplary embodiments detect when the system reaches a fixed point attractor.

Figure 1:
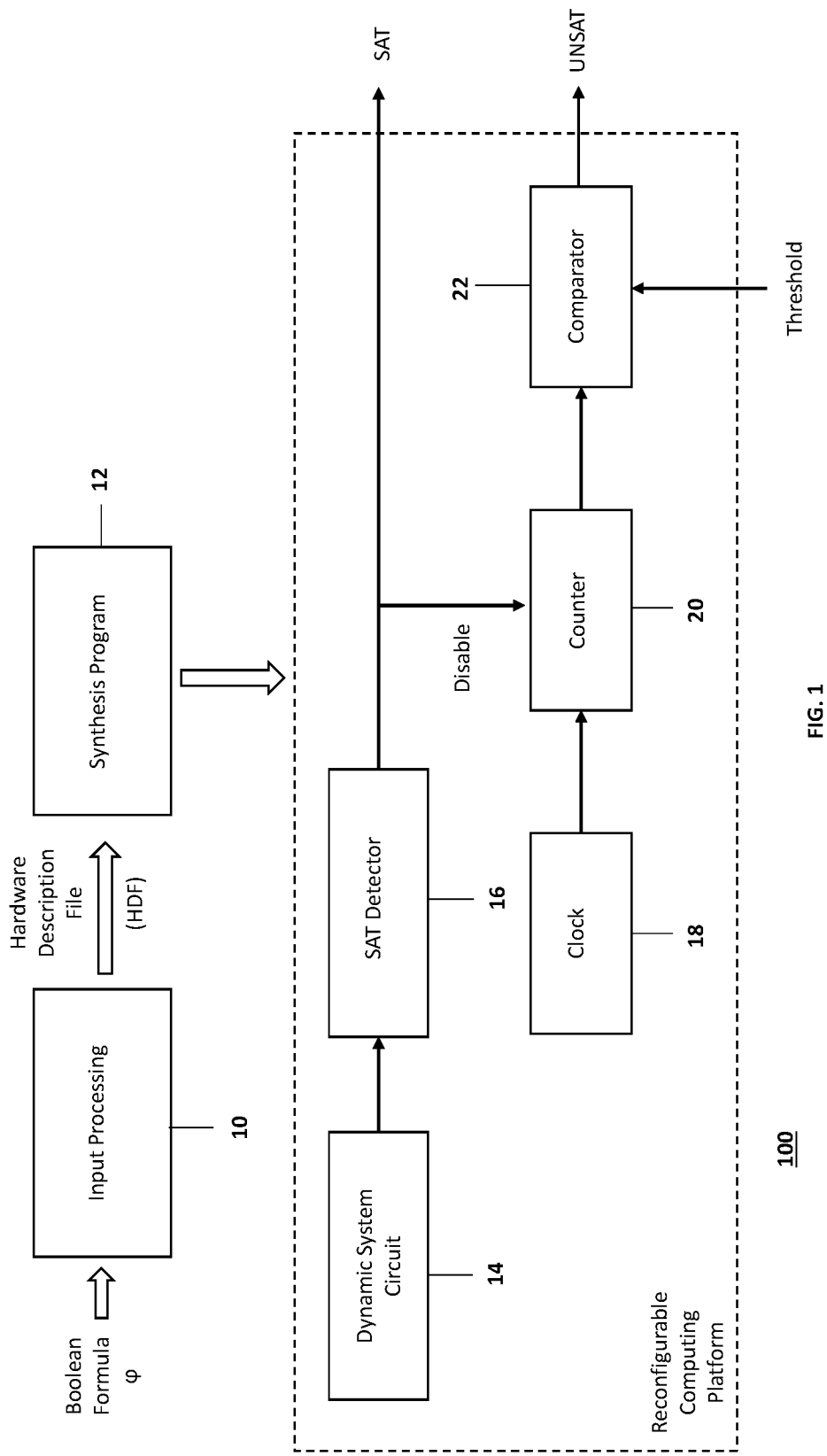
FIG. 1 illustrates a system in accordance with exemplary embodiments.

A system 100 in accordance with exemplary embodiments in a block diagram form is illustrated in FIG. 1. System 100 may include an input processing software module 10. Module 10 may process a given input CNF Boolean formula ($\varphi$). The processing may consist of factoring the given input CNF into a form that can be converted into a dynamical system that can generate a hardware description language file for encoding a corresponding circuit. A synthesis program software module 12 (of system 100) may take the hardware description file (HDF) that is output by module 10 and perform circuit synthesis and program a reconfigurable computing device (FPGA for example) to implement the remainder of system 100.

System 100 may also include a dynamical system circuit 14. Dynamical system circuit 14 may consist of a collection of circuit elements for solving the SAT instance. Circuit 14 may be derived from the software processing in module 10. A SAT detector circuit 16 (of system 100) may receive, as input, the output of each element of the dynamical system circuit 14 (that corresponds to a variable in the original formula). SAT detector circuit may output whether the values of the elements (logical values) of circuit 14 satisfy the given SAT instance.

A clock 18 in system 100 may trigger a counter 20 for counting the number of clock cycles that have elapsed since the circuit was instantiated on the reconfigurable computing device. If the output of circuit 16 is TRUE, the counter is not enabled (or stopped) and the counter may be fixed at the time the circuit 16 reached its fixed point value. If the output of circuit 16 is FALSE, the counter may be enabled.

A comparator 22 may compare the current counter value to a predetermined threshold. If the counter value is greater than the threshold, an unsatisfiable SAT instance may be declared (UNSAT in FIG. 1). The threshold may be user specific, application specific, dependent on number of variables, on number of clauses or based on the clock cycle for example.

Software module 10 may convert a CNF Boolean formula into a dynamical system as described below. The input formula $\varphi = \omega_1 \wedge \omega_2 \wedge \ldots \omega_M$ consists of the conjunction of M clauses $\omega_m$, each of which consist of the disjunction of one or more literals. Each of the literals are either a Boolean variable $x_i$ or its logical negation, $\neg x_i$.

The CNF formula can be factored by each variable (or its negation). The remaining literals of each clause in which it (the factored variable or its negation) appears in are collected to form the conjunction of the resulting clauses. That is, for each $x_i$, a new clause $\omega_m^{-i}$ may be formed that either (a) consists of the conjunction of the literals of $\omega_m$ without $x_i$ if $x_i$ appears in $\omega_m$, or (b) is TRUE if $x_i$ does not appear in $\omega_m$. These clauses may be gathered in the formulae $F_i = \omega_1^{-i} \wedge \omega_2^{-i} \wedge \ldots \omega_M^{-i}$ for each i. Similarly, the formulae $G_i = \omega_1^{+i} \wedge \omega_2^{+i} \wedge \ldots \omega_M^{+i}$ may be formed where $\omega_m^{+i}$ consists of the conjunction of the literals of $\omega_m$ without $\neg x_i$ if $\neg x_i$ appears in $\omega_m$ or TRUE if $\neg x_i$ does not appear in $\omega_m$. The formula may be rewritten as:

$$\varphi = (x_1 \vee F_1) \wedge (\neg x_1 \vee G_1) \wedge (x_2 \vee F_2) \wedge (\neg x_2 \vee G_2) \wedge \ldots (x_N \vee F_N) \wedge (\neg x_N \vee G_N) \qquad [1]$$

This form has more terms, but converting back to CNF shows that the additional terms are duplicates of clauses already in the formula and thus it is logically equivalent to the original form in that a set of values for the variables $x_i$ that makes the original form TRUE will make the modified form TRUE and vice versa.

Figures 2A, 2B:
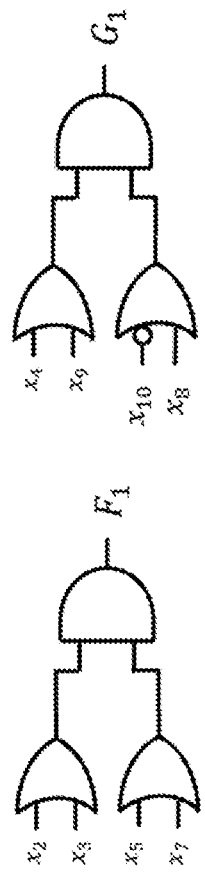
FIG. 2(a) illustrates transformation of an exemplary input formula in accordance with exemplary embodiments.
FIG. 2(b) illustrates a digital logic element implementation corresponding to the exemplary input formula of FIG. 2(a) in accordance with exemplary embodiments.

An example of the preceding calculation is illustrated in FIG. 2(a). In the example, the input Boolean function is given in CNF form as:

$$\varphi = (x_1 \vee x_2 \vee x_3) \wedge (x_1 \vee x_5 \vee x_7) \wedge (\neg x_1 \vee x_4 \vee x_9) \wedge (\neg x_{10} \vee \neg x_1 \vee x_8)$$

After removing the variable $x_1$, the remaining literals can be collected to calculate $$F_1 = \omega_1^{-1} \wedge \omega_2^{-1} \wedge \ldots \omega_M^{-1} = (x_2 \vee x_3) \wedge (x_5 \vee x_7) \qquad [2.1]$$

where clauses $\omega_m^{-1}$ that are TRUE are suppressed (the clauses not containing $x_1$ in this case) since they do not affect the value of $F_1$.

Similarly, the formulae $G_1$ can be calculated by removing $\neg x_1$ and collecting the remaining variables $$G_1 = \omega_1^{+1} \wedge \omega_2^{+1} \wedge \ldots \omega_M^{+1} = (x_4 \vee x_9) \wedge (\neg x_{10} \vee x_8) \qquad [2.2]$$

The functions obtained by the process illustrated in FIG. 2(a) may be converted into the corresponding logical circuit 200 that implements these functions as illustrated in FIG. 2(b).

The process of calculating F and G may be repeated N times. That is, if N=5 (potentially including $x_1$, $x_2$, $x_3$, $x_4$ and $x_5$ and their negation(s)), this process may be repeated five times to generate $F_1$, $G_1$, $F_2$, $G_2$, $F_3$, $G_3$, $F_4$, $G_4$, $F_5$ and $G_5$.

An assumption may be made that the formula $\varphi = \ldots \wedge (x_i \vee F_i) \wedge (\neg x_i \vee G_i) \wedge \ldots$ is TRUE. If $\varphi$ is TRUE, $\neg x_i \rightarrow F_i$ and $x_i \rightarrow G_i$ for all i. We can use contraposition to rewrite this as $\neg F_i \rightarrow x_i$ and $\neg G_i \rightarrow \neg x_i$. The dynamical system in accordance with exemplary embodiments may use these implications as the following update rules: If $F_i$ is FALSE and $G_i$ is TRUE, $x_i$ is set to TRUE. If $F_i$ is TRUE and $G_i$ is FALSE, $x_i$ is set to FALSE. If both $F_i$ and $G_i$ are TRUE, then changing $x_i$ is irrelevant to the final value of $\varphi$. If both $F_i$ and $G_i$ are FALSE, then there is a contradiction and changing $x_i$ may resolve it.

Figure 3:
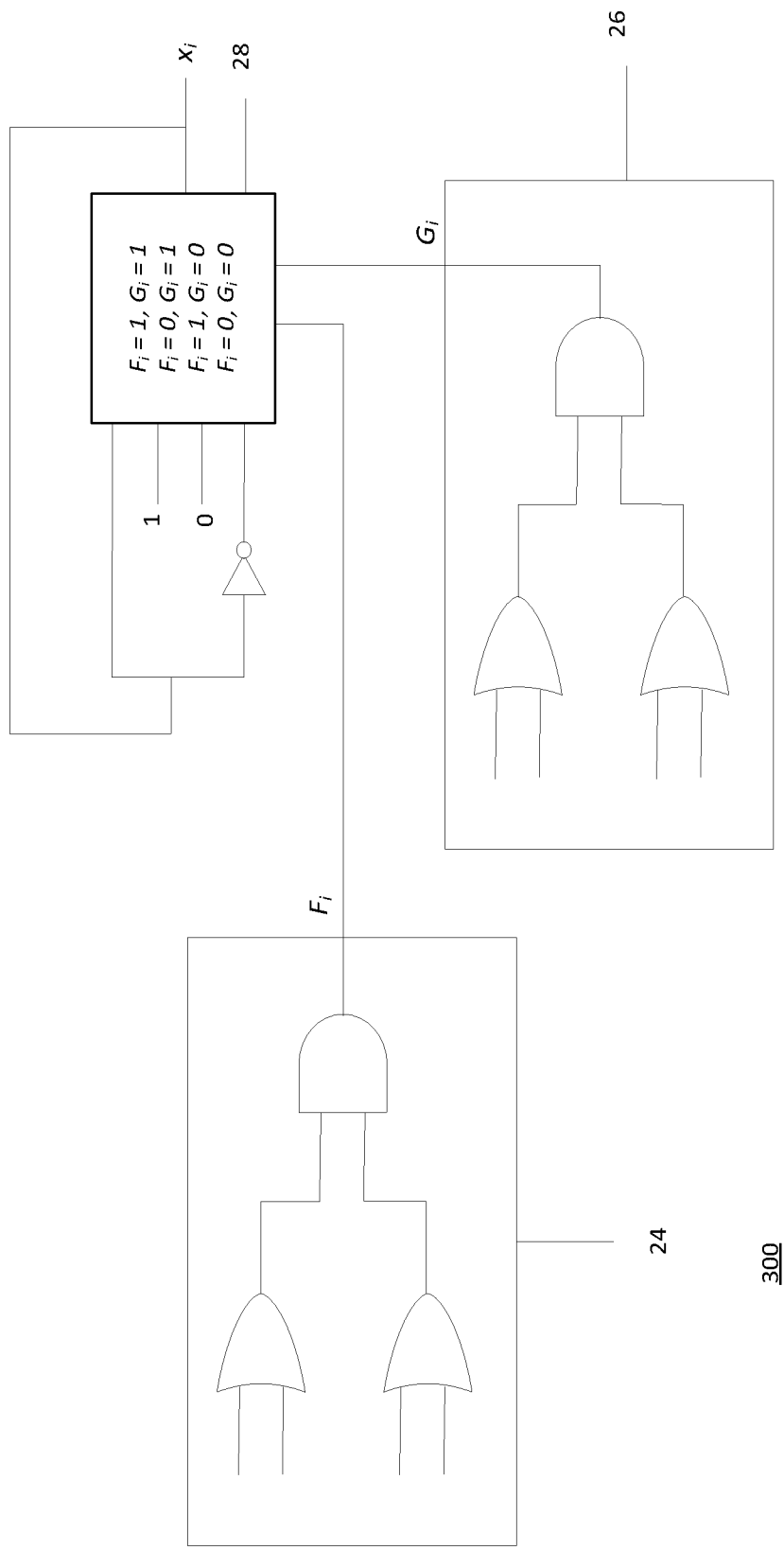
FIG. 3 illustrates a circuit schematic of the elements that comprise the dynamical system in FIG. 1.

The elements of circuit 14 (FIG. 1) are illustrated in detail as circuit 300 in FIG. 3. The inputs to the element may be the outputs of other elements that correspond to variables in the functions $F_i$ and $G_i$. The element may consist of a block 24 that may implement the function $F_i$ and a block 26 that may implement the function $G_i$. The outputs of blocks 24 and 26 may be connected to a multiplexer 28. The output of multiplexer 28 may be fed back into the input into two of the available channels, either as the signal itself or as inverted. The input values "1" and "0" to multiplexer 28 in FIG. 3 may refer to logical TRUE and logical FALSE.

The output value of the multiplexer 28 which corresponds to the value of $x_i$ at an instant of time may be selected by the outputs of blocks 24 and 26. While blocks 24 and 26 are depicted in this illustrated example as a circuit that implements the AND (conjunction) of the OR (disjunction) of a total of four inputs, the number of inputs and polarity (i.e., whether it is negated or not) may depend on the input formula. If the number of variables N is five, then there are five circuits 300 having $x_1$, $x_2$, $x_3$, $x_4$ and $x_5$ as outputs.

A construction detail of the circuit 14 is that the time for signals to propagate through the multiplexers in FIG. 3, the circuits that calculate $F_i$ and $G_i$, and the connections between the elements $x_i$ in the circuit 14 of FIG. 1 should be non-zero, non-uniform, and incommensurate in order that the dynamical system can appropriately explore the phase space and get close to attracting fixed points. Synchrony between the elements of circuit 14 may render it unable to find a satisfying assignment.

Figure 4:
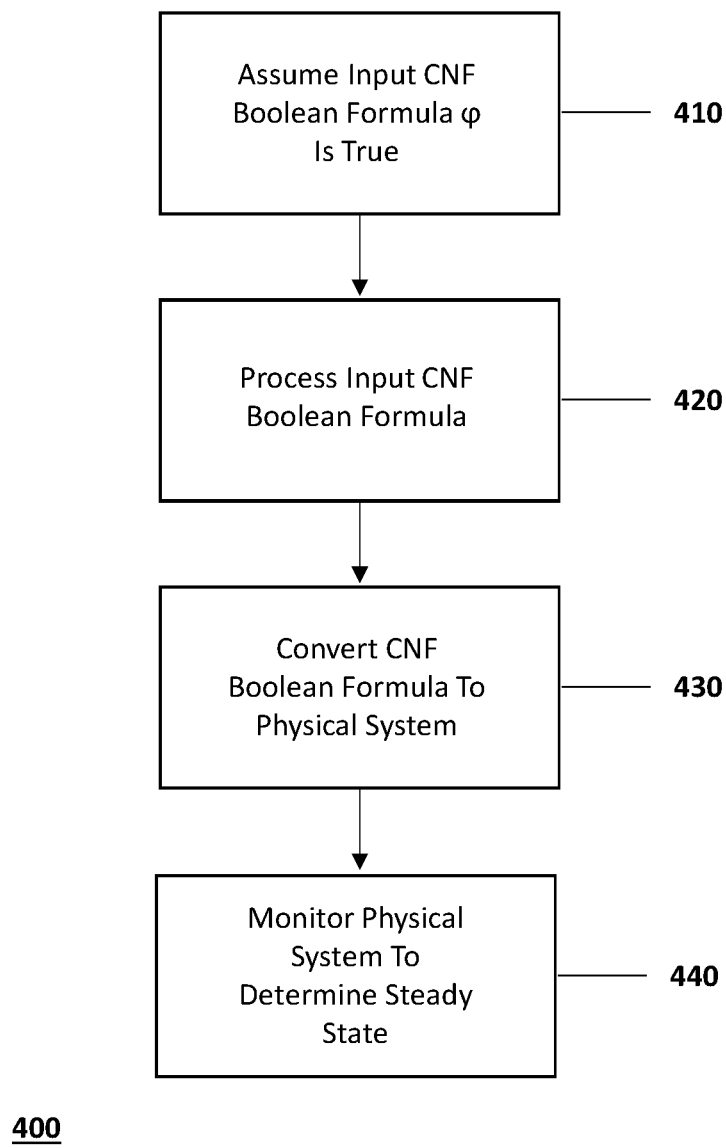
FIG. 4 illustrates a method in accordance with exemplary embodiments.

A method 400 in accordance with exemplary embodiments may be described with reference to FIG. 4. As an initial condition, at step 410, an assumption is made that the input CNF formula $\varphi = \omega_1 \wedge \omega_2 \wedge \ldots \omega_M$ is true.

At step 420, the input CNF Boolean formula (Equation 1 above) may be processed. The processing may be performed, for example, by module 10 (of FIG. 1) as described. The processing may consist of factoring the given input CNF into a form that can be converted into a dynamical system (Equations 2.1 and 2.2 above) that can generate a hardware description language file for encoding a corresponding circuit.

At step 430, the processed (factored) input CNF formula may be converted to a physical system such as that illustrated FIG. 3. At step 440, the output of the physical system ($x_i$ in FIG. 3) may be monitored to determine if a steady state has been reached. Steady state in this context implies achieving Boolean satisfiability (SAT).

The hardware components illustrated within the dashed line of FIG. 1 (i.e. components 14, 16, 18, 20 and 22) as well as the hardware components illustrated in FIG. 2(b) and FIG. 3 may be implemented on (or programmed onto) a FPGA to satisfy the Boolean satisfiability problem.

Exemplary embodiments describe a method of generating a dynamical system that solves a given SAT instance that can be implemented on reconfigurable computing equipment such as FPGAs.

Systems and methods in accordance with exemplary embodiments as described herein result in increased efficiency, faster processing and higher throughput.

While the foregoing disclosure enables one of ordinary skill to make and use what is considered presently to be the best mode thereof, those of ordinary skill will understand and appreciate the existence of variations, combinations, and equivalents of the specific embodiment, method, and examples herein. The description should therefore not be limited by the above described embodiments, methods and examples, but by all embodiments and methods within the scope and spirit of the disclosure. All such embodiments are intended to be covered by the appended claims.

Further, in the description and the appended claims the meaning of "comprising" is not to be understood as excluding other elements or steps. Further, "a" or "an" does not exclude a plurality, and a single unit may fulfill the functions of several means recited in the claims.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for determining Boolean satisfiability (SAT) comprising:
    processing an input conjunctive normal form (CNF) Boolean formula;
    converting the processed input CNF Boolean formula to a physical system;
    monitoring an output of the physical system to determine if a steady state has been reached;
    enabling a counter triggered by a clock signal if the physical system has not reached a steady-state;
    comparing the value of the counter with a pre-determined threshold; and
    alerting the user when the counter exceeds the threshold.

2. The method of claim 1, wherein the processing of the input CNF Boolean formula comprises:
    factoring the CNF;
    converting the factored form into a dynamical system;
    generating a hardware description file using the dynamical system; and
    encoding a circuit utilizing the hardware description file.

3. The method of claim 2, wherein the circuit is implemented on a reconfigurable computing device.

4. The method of claim 3, wherein the reconfigurable computing device is a Field Programmable Gate Array (FPGA).

5. The method of claim 1, wherein the input Boolean formula is a conjunction of a plurality of clauses with each clause being a disjunction of at least one Boolean literal.

6. The method of claim 5, wherein the processing of the Boolean formula comprises:
    (i) factoring a Boolean variable from each of the plurality of clauses in which the first variable occurs without negation;
    (ii) placing each of the remaining literals within a clause in a disjunctive form;
    (iii) placing a plurality of disjunctive clauses in a conjunctive form; and
    (iv) repeating (i) to (iii) for each subsequent literal in the formula.

7. The method of claim 6, further comprising:
    (i) factoring a negation of a Boolean variable from each of the plurality of clauses in which the negation of the first variable occurs;
    (ii) placing each of the remaining literals within a clause in a disjunctive form;
    (iii) placing a plurality of disjunctive clauses in a conjunctive form; and
    (iv) repeating (i) to (iii) for a negation of each subsequent literal in the formula.

8. The method of claim 7, further comprising:
    implementing the conjunctive form of each variable via at least one circuit element; and
    implementing the conjunctive form of the negation of each variable via at least one circuit element.

9. The method of claim 1, further comprising:
    declaring a solution to the SAT instance based on the steady state of the system.

10. The method of claim 1, wherein the pre-determined threshold is a user definable threshold.

11. A system for determining Boolean satisfiability (SAT) comprising:
    a first module processing an input conjunctive normal form (CNF) Boolean formula and outputting a hardware description file (HDF); and
    a second module receiving the HDF from the first module, performing circuit synthesis on the received HDF and programming a reconfigurable computing device, wherein the reconfigurable computing device comprises:
        a dynamical system circuit including a collection of circuit elements, the dynamical system circuit being derived from the CNF formula processed in the first module;
        a SAT detector circuit receiving output of each of the elements of the dynamical system circuit and outputting a decision on whether logical values associated with the received output of the elements satisfies a Boolean satisfiability of a given SAT instance;
        a clock; and
        a counter triggered by the clock for monitoring a time lapse from an instantiation of a circuit on the reconfigurable device.

12. The system of claim 11, wherein the counter is not enabled if the decision output by the SAT detector is TRUE.

13. The system of claim 11, wherein the counter is enabled if the decision output by the SAT detector is FALSE.

14. The system of claim 13, further comprising:
a comparator for comparing a value of the counter to a predetermined threshold.

15. The system of claim 14, wherein a user is alerted that a solution cannot be found for a SAT instance if the counter value is greater than the predetermined threshold.

16. The system of claim 14, wherein a SAT instance is not declared if the counter value is less than or equal to the predetermined threshold and the SAT detector is not SAT.

* * * * *